United States Patent
Heinkele et al.

(10) Patent No.: US 8,826,892 B2
(45) Date of Patent: Sep. 9, 2014

(54) METHOD AND DEVICE FOR OPERATING AN INTERNAL COMBUSTION ENGINE HAVING A COMPRESSOR FOR COMPRESSING THE AIR SUPPLIED TO THE INTERNAL COMBUSTION ENGINE

(75) Inventors: Matthias Heinkele, Leonberg (DE); Patrick Menold, Stuttgart (DE); Michael Drung, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 13/138,505

(22) PCT Filed: Feb. 18, 2010

(86) PCT No.: PCT/EP2010/052039
§ 371 (c)(1),
(2), (4) Date: Nov. 3, 2011

(87) PCT Pub. No.: WO2010/100033
PCT Pub. Date: Sep. 10, 2010

(65) Prior Publication Data
US 2012/0037132 A1  Feb. 16, 2012

(30) Foreign Application Priority Data
Mar. 4, 2009  (DE) .......................... 10 2009 001 326

(51) Int. Cl.
| | |
|---|---|
| F02B 33/00 | (2006.01) |
| F02B 33/44 | (2006.01) |
| F02B 39/16 | (2006.01) |
| F02D 41/22 | (2006.01) |
| F02D 41/00 | (2006.01) |
| F02B 39/12 | (2006.01) |
| F02D 41/18 | (2006.01) |
| F02B 33/34 | (2006.01) |

(52) U.S. Cl.
CPC ............... *F02D 41/221* (2013.01); *Y02T 10/40* (2013.01); *F02B 39/16* (2013.01); *F02D 41/0007* (2013.01); *Y02T 10/144* (2013.01); *F02B 39/12* (2013.01); *F02D 41/18* (2013.01); *F02D 2200/0402* (2013.01); *F02B 33/34* (2013.01)
USPC ..................... 123/559.3; 123/559.1; 123/561; 60/598

(58) Field of Classification Search
USPC ............ 123/59.3, 564; 477/906; 60/598, 600, 60/602, 607
See application file for complete search history.

(56) References Cited

U.S. PATENT DOCUMENTS

| | | | |
|---|---|---|---|
| 5,022,375 A | 6/1991 | Goto et al. | |
| 5,191,789 A * | 3/1993 | Furuya | ........................ 73/114.33 |

(Continued)

FOREIGN PATENT DOCUMENTS

| | | |
|---|---|---|
| DE | 10 2006 015 931 | 10/2007 |
| DE | 10 2006 061 567 | 10/2007 |

(Continued)

*Primary Examiner* — Thomas Denion
*Assistant Examiner* — Jessica Kebea
(74) *Attorney, Agent, or Firm* — Kenyon & Kenyon LLP

(57) ABSTRACT

In a method for operating an internal combustion engine having a compressor, the diagnosing of a clutch of the compressor is achieved without an additional sensor system. The compressor is turned on via the clutch, and a variable characterizing the air-mass flow to the internal combustion engine is ascertained. A first value of the variable characterizing the air mass flow before turning on the compressor is compared to a second value of the variable characterizing the air mass flow after turning on the compressor by closing the clutch, and an error is detected as a function of a deviation between the first value and the second value of the variable characterizing the air mass flow.

21 Claims, 3 Drawing Sheets

(56) References Cited

U.S. PATENT DOCUMENTS

| | | | | |
|---|---|---|---|---|
| 5,546,795 | A * | 8/1996 | Yamagishi | 73/114.33 |
| 6,349,708 | B1 * | 2/2002 | Horlacher et al. | 123/559.3 |
| 6,425,247 | B1 * | 7/2002 | Schmid | 60/602 |
| 6,694,734 | B2 * | 2/2004 | Akao et al. | 60/605.1 |
| 7,251,989 | B2 * | 8/2007 | Baeuerle | 73/114.37 |
| 2007/0131206 | A1 | 6/2007 | Rollinger et al. | |
| 2007/0199553 | A1 * | 8/2007 | Thiel et al. | 123/690 |
| 2007/0266706 | A1 * | 11/2007 | Gehrke et al. | 60/605.1 |
| 2008/0047525 | A1 * | 2/2008 | Morizane et al. | 123/344 |
| 2009/0205599 | A1 * | 8/2009 | Ruiz | 123/90.17 |
| 2011/0010076 | A1 * | 1/2011 | Heinkele et al. | 701/103 |

FOREIGN PATENT DOCUMENTS

| | | |
|---|---|---|
| EP | 1 744 029 | 1/2007 |
| EP | 1 749 998 | 2/2007 |
| JP | 59-77032 | 5/1984 |
| JP | 62-178730 | 8/1987 |
| JP | 1315612 | 12/1989 |
| JP | 2-112937 | 9/1990 |
| JP | 2005-344707 | 12/2005 |
| WO | WO 2008/035018 | 3/2008 |

* cited by examiner

METHOD AND DEVICE FOR OPERATING AN INTERNAL COMBUSTION ENGINE HAVING A COMPRESSOR FOR COMPRESSING THE AIR SUPPLIED TO THE INTERNAL COMBUSTION ENGINE

BACKGROUND OF THE INVENTION

1. Field of the Invention

The present invention relates to a method and a device for operating an internal combustion engine having a compressor for compressing the air supplied to the internal combustion engine.

2. Description of Related Art

An internal combustion engine having a compressor is known from published German patent application document DE 10 2006 061 567 Al, the compressor being able to be connected to the crankshaft of the internal combustion engine via a clutch. A throttle valve is situated upstream of an injector in an intake manifold, in this instance, and upstream of this, in turn, an HFM sensor, which records the air mass flowing through the intake manifold.

BRIEF SUMMARY OF THE INVENTION

By contrast, the method according to the present invention and the device according to the present invention have the advantage that a first value of the variable characterizing the air mass flow, before the switching on of the compressor by closing the clutch, is compared to a second value of the variable characterizing the air mass flow after the switching on of the compressor by closing the clutch, and an error is detected as a function of a deviation of the first value of the first variable characterizing the air mass flow from the second value of the variable characterizing the air mass flow. In this manner one is able to diagnose whether the clutch is closing correctly. Consequently, a diagnosis of the clutch of the compressor is enabled, which does not require any additional sensor system.

It is of advantage if the second value of the variable characterizing the air mass flow is ascertained after the expiration of a specified time since the closing of the clutch. This increases the reliability of the diagnosis, since, as a rule, after closing the clutch so as to engage the compressor, the air mass flow will not change abruptly but steadily.

It is also advantageous that an error is detected if the second value of the variable characterizing the air mass flow exceeds the first variable characterizing the air mass flow by less than a first specified threshold value. In this way the reliability of the diagnosis is also increased, and it is prevented that measuring inaccuracies and tolerances, during the ascertainment of the first value of the variable characterizing the air mass flow and the second value of the variable characterizing the air mass flow, corrupt the diagnostic result.

It is of particular advantage that an error is detected if the second value of the variable characterizing the air mass flow is less than the first value of the variable characterizing the air mass flow. In this case, an error is able to be detected during the closing of the clutch, for turning on the compressor, especially simply and rapidly, and without a further threshold value comparison.

It is particularly advantageous that a bypass valve, connected in parallel to the compressor, is operated in the closing direction, is preferably completely closed if the compressor is turned on by closing the clutch. In this way, it is ensured that the air mass flow has to flow mainly or completely via the compressor, so that the comparison of the first value of the variable characterizing the air mass flow to the second value of the variable characterizing the air mass flow is able to be interpreted, even more reliably, on the presence of an error during the closing of the clutch for turning on the compressor.

Furthermore, it is of advantage that, when an error is detected, the bypass valve is operated again in the opening direction, preferably is opened completely. In this way, even in the case where an error was detected when closing the clutch of the compressor for turning on the compressor, an operation under emergency conditions of the internal combustion engine via the bypass valve is able to be implemented.

Moreover, it is of advantage that the second value of the variable characterizing the air mass flow is calculated as a function of operating variables of the internal combustion engine, preferably of a pressure drop over the compressor, a temperature of the air supplied to the compressor and an engine speed of the internal combustion engine, that the second value of the variable characterizing the air mass flow is measured, and that an error is detected only if the measured second value of the variable characterizing the air mass flow is less than the calculated second value of the variable characterizing the air mass flow. In this way, the reliability of the diagnosis is increased even further in that an additional plausibilization of the ascertained second value of the variable characterizing the air mass flow takes place.

Still another advantage comes about in that the error is detected only if the measured second value of the variable characterizing the air mass flow falls below the calculated second value of the variable characterizing the air mass flow by at least a second specified threshold value. In this way, the reliability of the diagnosis of the closing of the clutch for turning on the compressor is increased even further, since now measuring inaccuracies and tolerances in the measurement of the second value of the variable characterizing the air mass flow and in the calculation of the second value of the variable characterizing the air mass flow are taken into account.

DETAILED DESCRIPTION OF THE INVENTION

Figure 1:
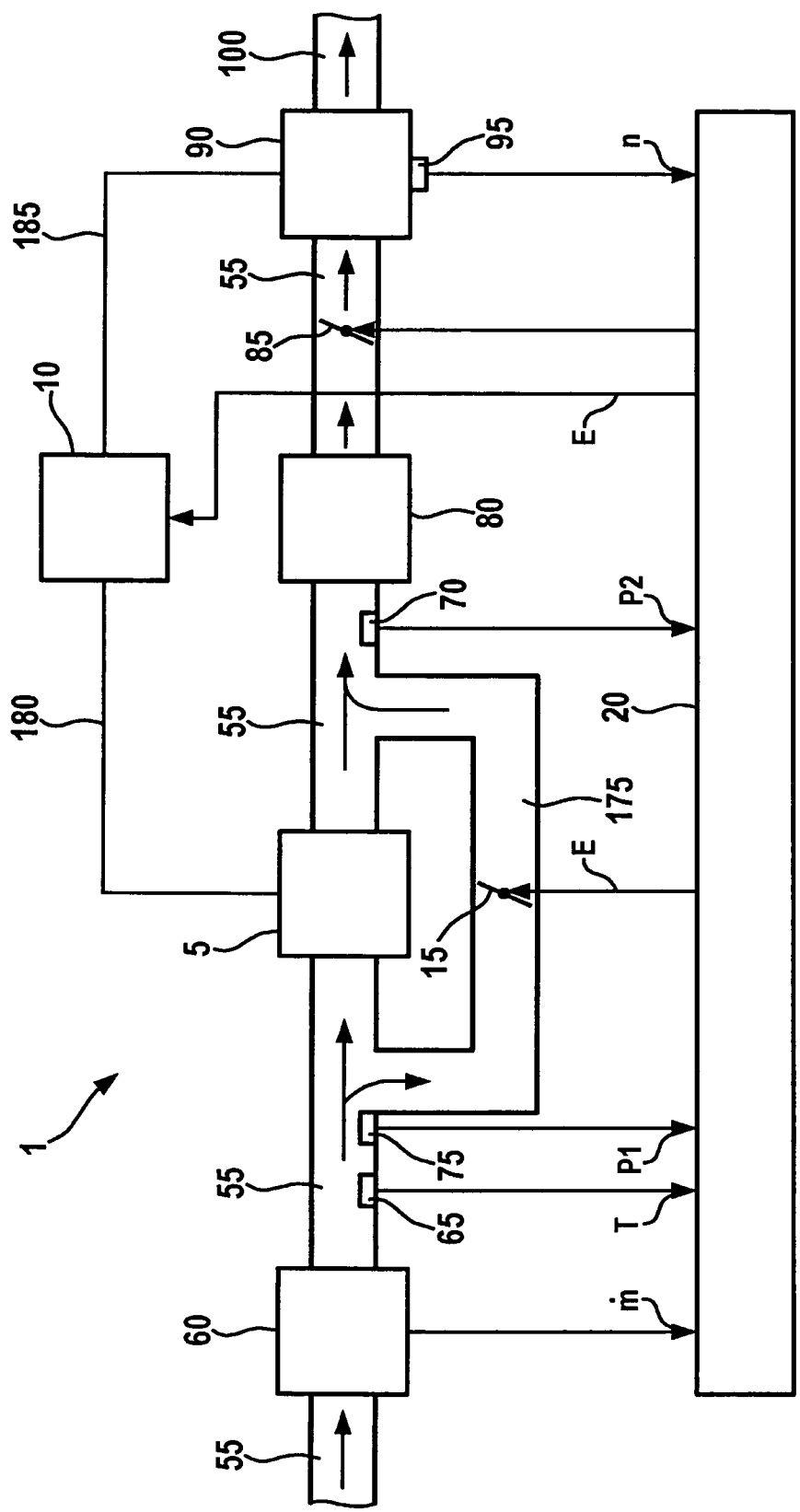
FIG. 1 shows a block diagram of an internal combustion engine.

In FIG. 1, reference numeral 1 denotes an internal combustion engine, which may be developed as an Otto engine or a Diesel engine. Fresh air is supplied via an air supply 55 to a combustion chamber of an engine block 90 of internal combustion engine 1, having one or more cylinders that are not shown in FIG. 1. The flow direction of the fresh air in air supply 55 is indicated by arrows in FIG. 1. A throttle valve 85 is situated in air supply 55. The air mass flow to the combustion chamber of engine block 90 is influenced by the degree of opening of throttle valve 85. The degree of opening of throttle valve 85 is set by a control unit 20. The setting of the degree of opening of throttle valve 85, for example, is a function of a power requirement on internal combustion engine 1, in this instance. The power requirement may be derived, for instance, from the degree of operation of an accelerator, in the case in which the internal combustion engine 1 is driving a vehicle. The power requirement may, in addition or alternatively, also originate with other vehicle functions, such as an antilock brake system, a traction control system, an electronic stability program, a vehicle speed controller or the like.

Upstream of throttle valve 85, an intercooler 80 is situated in air supply 55. Upstream of intercooler 80, a second pressure sensor 70 is situated in air supply 55. Upstream of second pressure sensor 70, a compressor 5 is situated in air supply 55. Compressor 5 is connected to clutch 10 via a shaft 180. Engine block 90 drives a crankshaft 185, which is also connected to clutch 10. When clutch 10 is closed, the motion of crankshaft 185 is transmitted to shaft 180, so that compressor 5 is driven by crankshaft 185 when clutch 10 is closed. In this case, compressor 5 compresses the air of air supply 55 that is guided through it. On the other hand, if clutch 10 is opened, compressor 5 is not connected to crankshaft 185. As soon as the compressor stands still, lacking connection to crankshaft 185, it can no longer compress the air in air supply 55.

A bypass channel 175, having a bypass valve 15, is connected in parallel to compressor 5. Depending on the degree of opening of bypass valve 15, a different air mass flow comes about through bypass channel 175. The degree of opening of bypass valve 15, in this context, is also set by control unit 20, namely, depending on whether compressor 5 is being driven via clutch 10 by crankshaft 185 or not. In the case in which compressor 5 is being driven by crankshaft 185 in response to a closed clutch 10, bypass valve 15 is operated in the closing direction, and preferably closed entirely. In this way, the entire air mass flow in air supply 55 is compressed by compressor 5, and thus the charge of the combustion chamber in engine block 90 with fresh air is maximized. A complete closing of bypass valve 15 occurs, above all, when the driver requests maximum load. At lower load requirements by the driver, bypass valve 15 is partially open, as a rule, in response to completely opened throttle valve 85. If, on the other hand, at opened clutch 10, compressor 5 is not driven by crankshaft 185, but is standing still, then, as a rule, no air, or only negligible air is able to flow through compressor 5 that is standing still, on the assumption that compressor 5 is sufficiently airtight when standing still. In this case bypass valve 15 is operated by control unit 20 in the opening direction, preferably completely opened. Consequently, in this case internal combustion engine 1 is able to be operated as a usual naturally aspirated engine without compression.

Second pressure sensor 70 records the pressure downstream from compressor 5, and supplies a corresponding measuring signal to control unit 20. Upstream of compressor 5 a first pressure sensor 75 is situated in air supply 55, which measures the pressure upstream of compressor 5 in air supply 55, and outputs a corresponding measuring signal to control unit 20. Also upstream of compressor 5, according to FIG. 1, also upstream of first pressure sensor 75, in air supply 55, there is a temperature sensor 65, which measures the temperature of the air in air supply 55 upstream of compressor 5, and passes on a corresponding measuring signal to control unit 20. Upstream of temperature sensor 65 and first pressure sensor 75, in air supply 55, there is an air mass meter, for instance, a hot-film air mass meter, which measures the air mass flow through air supply 55 and passes on a corresponding measuring signal to control unit 20. The measuring signal of air mass meter 60 is identified in FIG. 1 as $\dot{m}$, and represents the air mass flow that is being measured by the air mass meter in air supply 55. The measuring signal of temperature sensor 65 is identified by T in FIG. 1, and represents the temperature of the air in air supply 55 upstream of compressor 5 and downstream from air mass meter 60. The measuring signal of first pressure sensor 75 is identified in FIG. 1 by $p_1$, and represents the pressure upstream of compressor 5 and downstream from air mass meter 60 in air supply 55. The measuring signal of second pressure sensor 70 is identified in FIG. 1 by $p_2$, and represents the pressure downstream from compressor 5 and upstream of intercooler 80 in air supply 55. In the vicinity of engine block 90 a rotational speed sensor 95 is situated, which measures engine speed n of internal combustion engine 1, i.e. the rotational speed of crankshaft 185, and passes it on as the corresponding measuring signal to control unit 20.

The opening and the closing of clutch 10 is also induced by control unit 20, namely as a function of whether there is a requirement for compressing the air being supplied to the combustion chamber of engine block 90 or not. A requirement for closing clutch 10 exists, for instance, if, based on the accelerator actuation, it is determined that the driver intends to accelerate the vehicle. In this case, control unit 20 induces clutch 10 to close, in order to ensure a drive of compressor 5 by crankshaft 185, and in this way to support the acceleration command. On the other hand, if the driver lets up the accelerator, compression of the air supplied to the combustion chamber of engine block 90 is no longer required, and control unit 20 induces the opening of clutch 10, so that compressor 5 is no longer driven by crankshaft 185, and the air may thus be supplied to the combustion chamber of engine block 90 uncompressed. In this way, after the cutback of the engine power by letting up the accelerator, the command of the driver is better able to be met. The supply of fuel to the combustion chamber of engine block 90 and, if the internal combustion engine 1 is developed as an Otto engine, the ignition of the air/fuel mixture in the combustion chamber of engine block 90 by a spark plug, is not shown in FIG. 1 for reasons of clarity. The exhaust gas created during the combustion of the air/fuel mixture is discharged from the combustion chamber of engine block 90 via one or more exhaust valves, not shown in FIG. 1, of engine block 90 in an exhaust branch 100. Also for reasons of clarity, in FIG. 1 no intake valve of engine block 90 is shown, via which the air of air supply 55 gets into the combustion chamber of engine block 90.

Thus, in the present exemplary embodiment, we are looking at internal combustion engine 1 along with compressor 5 that is able to be driven mechanically via crankshaft 185, to which bypass channel 175, having bypass valve 15, is connected in parallel. Bypass valve 15 in this context is also referred to as the compressor control flap. Clutch 10, via which compressor 5 is able to be connected to crankshaft 185, may in principle have two tasks:

In the first place, because of clutch 10, compressor 5, in the near-idling range of internal combustion engine 1, may be released, and consequently, fuel saved when compressor 5 is not needed for the operation of internal combustion engine 1.

Secondly, it may be necessary to disengage compressor 5 at high engine speeds n, to protect it from overspeed.

In alternative specific embodiments in this context, for example, compressor 5 may also be installed downstream from throttle valve 85 in air supply 55. In addition to compressor 5, there may alternatively also be situated a turbocharger driven by a turbine in exhaust branch 100 downstream from compressor 5 in air supply 55.

Frequently, no position feedback is installed for clutch 10 of compressor 5, for reasons of cost. Therefore, it is not known whether clutch 10 has closed correctly.

A diagnosis of clutch 10 of compressor 5, for correct closing, is made possible by the subject matter of the present invention, without an additional sensor system being required.

Figure 2:
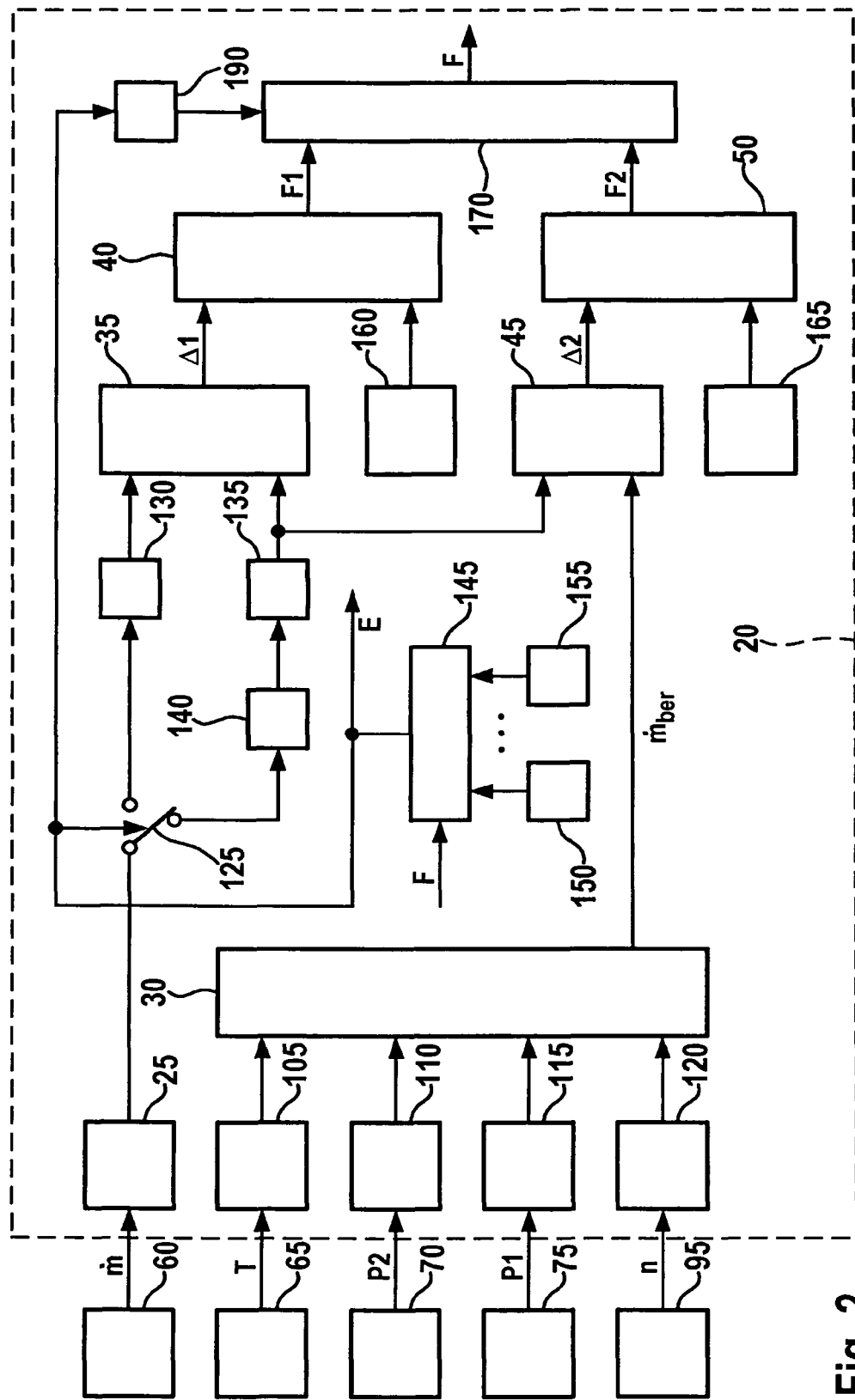
FIG. 2 shows a functional diagram for explaining the method according to the present invention and the device according to the present invention.

FIG. 2 shows a flow chart, which may be implemented in control unit 20 in the form of software and/or hardware.

Control unit 20 can be the engine control of internal combustion engine 1, in this instance. Alternatively, the flow chart of FIG. 2 may also be implemented in its own control unit, independently of the engine control unit or of the engine control of internal combustion engine 1 in the form of software and/or hardware.

The signal by which control 20 actuates clutch 10 to open or to close is designated in FIG. 1 by E.

In the following, for example, it will be assumed that the flow chart of FIG. 2 is implemented in the engine control unit of internal combustion engine 1. The flow chart as in FIG. 2, or rather control unit 20, represents an example for a device according to the present invention, and is used at the same time for the exemplary description of the sequence of the method according to the present invention.

In this context, device 20 includes a first ascertainment unit 25, which receives from air mass meter 60 the continuous measuring signal of air mass flow ṁ, and scans it at regular time periods, for instance, according to a specified computing grid. At the output of first ascertainment unit 25, the time-discrete scanning values of air mass flow ṁ are then supplied, in the computing grid of device 20, via a controlled switch 125, depending on the switch setting, either to a first memory 130 or via a time delay member 140 to a second memory 135.

Device 20 includes a second ascertainment unit 105, which has supplied to it a continuous measuring signal of temperature T by temperature sensor 65. In this context, second ascertainment unit 105 scans the received continuous measuring signal of temperature T in the computing grid described, and at its output emits a corresponding continuous temperature signal to a calculation unit 30. Device 20 includes a third ascertainment unit 110, to which a continuous measuring signal is supplied by second pressure sensor 70 for the second pressure $p_2$ downstream from compressor 5. Third ascertainment unit 110 scans the supplied measuring signal for second pressure $p_2$ in the computing grid described, and at its output emits a corresponding continuous signal for second pressure $p_2$ to calculation unit 30.

Device 20 includes a fourth ascertainment unit 115, to which a continuous measuring signal is supplied by first pressure sensor 75 for the first pressure $p_1$ upstream of compressor 5. Fourth ascertainment unit 115 scans the supplied measuring signal for first pressure $p_1$ in the computing grid described, and at its output emits a corresponding continuous signal for first pressure $p_1$ to calculation unit 30.

Device 20 includes a fifth ascertainment unit 120, to which a continuous measuring signal is supplied by rotational speed sensor 95 for engine speed n. Fifth ascertainment unit 120 scans the supplied measuring signal for engine speed n in the computing grid described, and at its output emits a corresponding continuous signal for engine speed n to calculation unit 30.

Device 20 furthermore includes a clutch control unit 145, to which a signal from an accelerator module 150 and possibly from additional load requirement modules 155 is supplied. At its output, clutch control unit 145 emits setting signal E which, as shown in FIG. 1, is supplied to clutch 10, and by which clutch 10 is induced to open or close. If clutch control unit 145 detects from accelerator module 150, or from one of external load requirement modules 155, a requirement for increasing the engine load, then at its output, using setting signal E, it gives a command for closing clutch 10, and with that, for turning on compressor 5. Such a requirement for increasing the load of internal combustion engine 1 is detected by clutch control unit 145, for instance, if it receives information from accelerator module 150 the information that the degree of operation of the accelerator was increased to initiate an acceleration of the vehicle. A requirement for increasing the load is, however, detected by clutch control unit 145 also, for instance, if it receives from one of the external load requirement modules 155 a corresponding requirement for increasing the load, for instance, from a vehicle speed controller, if the latter detects a requirement for increasing the setpoint speed of the vehicle. Setting signal E may additionally be supplied to compressor control flap 15. In the case of a requirement for increasing the load, in this instance, compressor control flap 15 is induced by setting signal E to move in the closing direction, and, according to one advantageous specific embodiment, to close completely, so that the air mass flow flows only through compressor 5, and not through bypass channel 175, so that the requirement for a load increase is able to be implemented as effectively and as rapidly as possible.

On the other hand, if clutch control unit 145 detects a requirement for lowering the load, such as by the detection of letting up the accelerator on the part of accelerator module 150 or, for instance, by lowering the setpoint value of the driving speed control, then, using setting signal E, it will induce clutch 10 to open. In this case compressor 5 is no longer driven by crankshaft 185, and is thus no longer able to compress the air supplied to the combustion chamber. In order for internal combustion engine 1 not to shut down, clutch control unit 145, using setting signal E, induces, at the same time, compressor control flap 15 to move in the opening direction, and, according to one advantageous exemplary embodiment, to open completely, so that the air mass flow is able to flow via bypass channel 175 to the combustion chamber of the engine block, on the assumption that compressor 5 is sufficiently airtight when it is standing still.

In addition, switch 125 is controlled by setting signal E. In the case of a requirement for a load increase, controlled switch 125 is brought into a first switching position, by setting signal E, in which the output of first ascertainment unit 25 is connected to the input of time delay member 140. In the case in which clutch control unit 145 receives a requirement for reducing the load, controlled switch 125 is induced by the resulting setting signal E to go over into a second switching position, in which it connects the output of first ascertainment unit 25 to the input of first memory 130. In other words, controlled switch 125 is located in its second switching position when clutch 10 is opened, and in its first switching position when clutch 10 is closed.

In the case where a plurality of load requirements is received from accelerator module 150 or from one or more external load requirement modules 155, clutch control unit 145 forms a resulting load requirement. In this context, for example, precedence may be given to the load requirement of accelerator module 150, if it is for a traveling speed above the setpoint speed of the vehicle speed controller. Otherwise, the load requirement of the vehicle speed controller may be given precedence. Let us look at an example, in this context, in which clutch control unit 145, except from accelerator module 150 and from an external load requirement modules 155, developed as a traveling speed regulation, is not supplied with load requirements by any further load requirement modules. What generally applies, is that, in the case of a plurality of load requirement modules in clutch control unit 145, a resulting load requirement is formed, and it is checked whether it corresponds to a requirement for a load increase or a load decrease, and that, in the case of a resulting requirement for a load increase, using setting signal E, clutch 10 is closed, compressor control flap 15 is also closed and switch 125 is brought into its first switching position. Otherwise, that is, for the case of a detected resulting requirement for load reduction in clutch control unit 145, clutch control unit 145 forms signal E in such a way that clutch 10 is opened by signal E, that compressor control flap 15 is opened by signal E and that switch 125 is brought into its second switching position.

If clutch 10 is already closed when one is ascertaining a resulting requirement for a load increase, if compressor control flap 15 is also closed and switch 125 is in its first switching position, setting signal E is not changed and the condition named is maintained. If conversely, in the case of the detection of a resulting requirement for load reduction in clutch control unit 145 clutch 10 is already opened, compressor control flap 15 is also already opened and switch 125 is in its second switching position, clutch control unit 145 also emits an unchanged setting signal E, in order to maintain this condition.

A load reduction which results in the opening of clutch 10 and the opening of compressor control flap 15, as well as bringing switch 125 into the second switching position, is able to take place also if clutch 10 is to be disengaged in a near-idling range or during idling of internal combustion engine 1, in order to save fuel, since compressor 5 is not needed in this operating range of internal combustion engine 1. Also, in an operation of internal combustion engine 1 at high load, it may be necessary, without a requirement for load reduction, to disengage compressor 5 at high engine speeds n, that is, to open clutch 10 and compressor control flap 15, and also to bring switch 125, that is connected to it, into the second switching position, so as to protect compressor 5 from overspeed.

If, for example, starting from an operating state of open clutch 10, during idling or a near-idling operating state of internal combustion engine 1, a requirement for a load increase is detected by clutch control unit 145, that is, if a jump is to take place from an operating point of internal combustion engine 1 from a low load, i.e. low charge of the combustion chamber, to a higher load, i.e. greater charge of the combustion chamber, then clutch 10 has to be closed using setting signal E. If, in addition, compressor control flap 15 is also completely closed by setting signal E, as described, boost pressure may be built up as rapidly as possible, and air supply 55, and with that, the combustion chamber may be filled with air.

At a lower load and open clutch 10, a small air mass flow $\dot{m}$ flows over air mass meter 60, which then flows on via opened compressor control flap 15, intercooler 80 and throttle valve 85 to the combustion chamber. When clutch 10 is closed, an air mass flow $\dot{m}$ flows via compressor 5, and it is determined by first pressure $p_1$ upstream of compressor 5, second pressure $p_2$ downstream from compressor 5, temperature T upstream of compressor 5 and engine speed n. This air mass flow is calculated in calculation unit 30, in a manner known to one skilled in the art, from the variables named, and is designated by $\dot{m}_{calc}$.

Now if, during a jump to a requested higher charge of the combustion chamber, compressor 5 is connected and compressor control flap 15 is closed at the same time, the whole air mass flow $\dot{m}$ supplied to the combustion chamber flows via compressor 5. Since air mass flow $\dot{m}$ via compressor 5 is relatively large, the closing of compressor control flap 15 leads to a very rapid increase in air mass flow $\dot{m}$ via air mass meter 60.

Then if, during the rapid closing of clutch 10 and compressor control flap 15, air mass flow $\dot{m}$ via air mass meter 60 does not increase in an expected manner, or even decreases, clutch 10 simply has not closed. In the worst case, internal combustion engine 1 may even shut down if compressor 5 is very airtight and does not let any air through when it is standing still.

This circumstance is used for the diagnosis of clutch 10. Time delay member 140 is used in this instance, during switching over switch 125 from the second switching position to the first switching position, to await a time specified by time delay member 140, before a scanning value of first ascertainment unit 25 is able to be written into second memory 135. In this context, in first memory 130 and in second memory 135, the last scanning value of air mass flow $\dot{m}$ transmitted there is always stored. The output of first memory 130 and the output of second memory 135 are supplied to a first comparator unit 35. The content of first memory 130 will be designated in the following as the first value of air mass flow $\dot{m}$, and the content of the second memory 135 as the second value of air mass flow $\dot{m}$. The first comparator unit 35 forms a first difference $\Delta 1$=second value of air mass flow $\dot{m}$–first value of air mass flow $\dot{m}$, and conducts first difference $\Delta 1$ to a first detection unit 40.

Time delay member 140 is intended to ensure that second memory 135 is overwritten with a new value for air mass flow $\dot{m}$ only when air mass flow $\dot{m}$, after the closing of compressor control flap 15, has hunted to a steady state at a higher value via air mass meter 60. For this, the time specified by time delay member 140 may be applied suitably on a test stand.

Consequently, because of time delay member 140, a debouncing of the diagnosis is made possible, which, based on the steady increase of the mass flow after the closing of clutch 10 and compressor control flap 15, prevents the diagnostic result from being corrupted. First difference $\Delta 1$ is compared in a first detection unit 40 to a first specified threshold value from a first threshold value memory 160. If first difference $\Delta 1$ is less than the first specified threshold value, then at the output of first detection unit 40 a first error signal F1 is set, otherwise, the. First error signal is reset. The first error signal is supplied to an AND gate 170. The first specified threshold value, for example, is suitably applied on a test stand in such a way that, in the case of an error-free closing of clutch 10, the difference $\Delta 1$ that is forming, with certainty, i.e. taking into account tolerances, is greater than the first threshold value, and that in the case of the undershooting of the first specified threshold value by first difference $\Delta 1$, one may assume with high probability an erroneous omission of the closing of clutch 10.

To improve the reliability of the diagnosis, as shown in FIG. 2, it may be provided that one should validate the measured signal of air mass meter 60 using the signal calculated in calculation unit 30. To do this, the output of second memory 135 is supplied to a second comparator unit 45. In addition, air mass flow $\dot{m}$ calculated by calculation unit 30 is also supplied to second comparator unit 45. Second comparator unit 45 forms a second difference $\Delta 2$, which comes about by subtracting calculated air mass flow $\dot{m}$ from the second value for the air mass flow from second memory 135. The difference $\Delta 2$ is then supplied to a second detection unit 50, to which a second specified threshold value is also supplied by a second threshold value memory 165. At its output, second detection unit 50 emits a set second error signal F2 if second difference $\Delta 2$ is less than the second specified threshold value, otherwise second detection unit 50 emits a reset signal as second error signal F2.

The second specified threshold value may be suitably applied on a test stand, for example, in such a way that it is undershot by second difference $\Delta 2$, in the case of an erroneous non-closing of clutch 10. The second specified threshold value is negative, in this context. The second specified threshold value, in this instance, takes into account tolerances in the calculation of calculated air mass flow $\dot{m}_{calc}$ and in the measurement of air mass flow $\dot{m}$. If the closing of clutch 10 erroneously does not take place, based on the pressure drop over compressor 5 between second pressure $p_2$ and first pressure $p_1$, a higher air mass flow $\dot{m}$ is calculated than may set in as measurement value by air mass meter 60, based on compressor 5 standing still and based on closed compressor control flap 15, based on the erroneous non-closing of clutch 10, as measurement value by air mass meter 60.

Second error signal F2 is also supplied to AND gate 170. AND gate 170 emits a resulting error signal F at its output, which is set if the two input signals F1, F2 are set and otherwise it is reset. In the case of a set resulting error signal F, an erroneously non-closing clutch 10 is diagnosed. In the case of a reset resulting error signal F, on the other hand, a correctly functioning clutch 10 is detected.

In addition, setting signal E is supplied to AND gate 170 via a release member 190. Release member 190 is programmed in such a way, in this context, that it emits a set signal to AND gate 170 only for a second specified time, namely, from the time at which, after the switching over of switch 125 from the second switching position to the first switching position, the overwriting of second memory 135 is released after the elapsing of the first specified time specified by time delay member 140. Release member 190 thus sets its output signal after the expiration of the first specified time since the switching over of switch 125 from its second switching position to its first switching position for the second specified time. Otherwise the output signal of release member 190 is reset. The resulting error signal F at the output of AND gate 170 is thus set only if the output signal of release member 190 is set together with first error signal F1 and second error signal F2, otherwise the resulting error signal F is reset. The resulting error signal F is also reset if the diagnosis of clutch 10 is not released by release member 190 in response to the reset output signal of release member 190. The second specified time may be suitably applied on a test stand, for example, in such a way that, on the one hand, it is selected to be sufficiently large to make available sufficient time for the diagnosis and, on the other hand, it is selected to be sufficiently small so as not to be impaired by load changes in response to a closed clutch 10.

In the case of a set resulting error signal F, one may, however, assume an erroneous non-closing clutch 10 of compressor 5. The resulting error signal F may be supplied, for instance, to clutch control unit 145. If it is reset, it is ignored by clutch control unit 145. Otherwise, that is, in the case of a set resulting error signal F, clutch control unit 145, via setting signal E, induces the opening of clutch 10 and the opening, preferably the complete opening of compressor control flap 15, so as to make possible an operation under emergency conditions of internal combustion engine 1. Internal combustion engine 1 may then after all be operated like a usual naturally aspirated engine via bypass channel 175, intercooler 80 and throttle valve 85.

Figure 3:
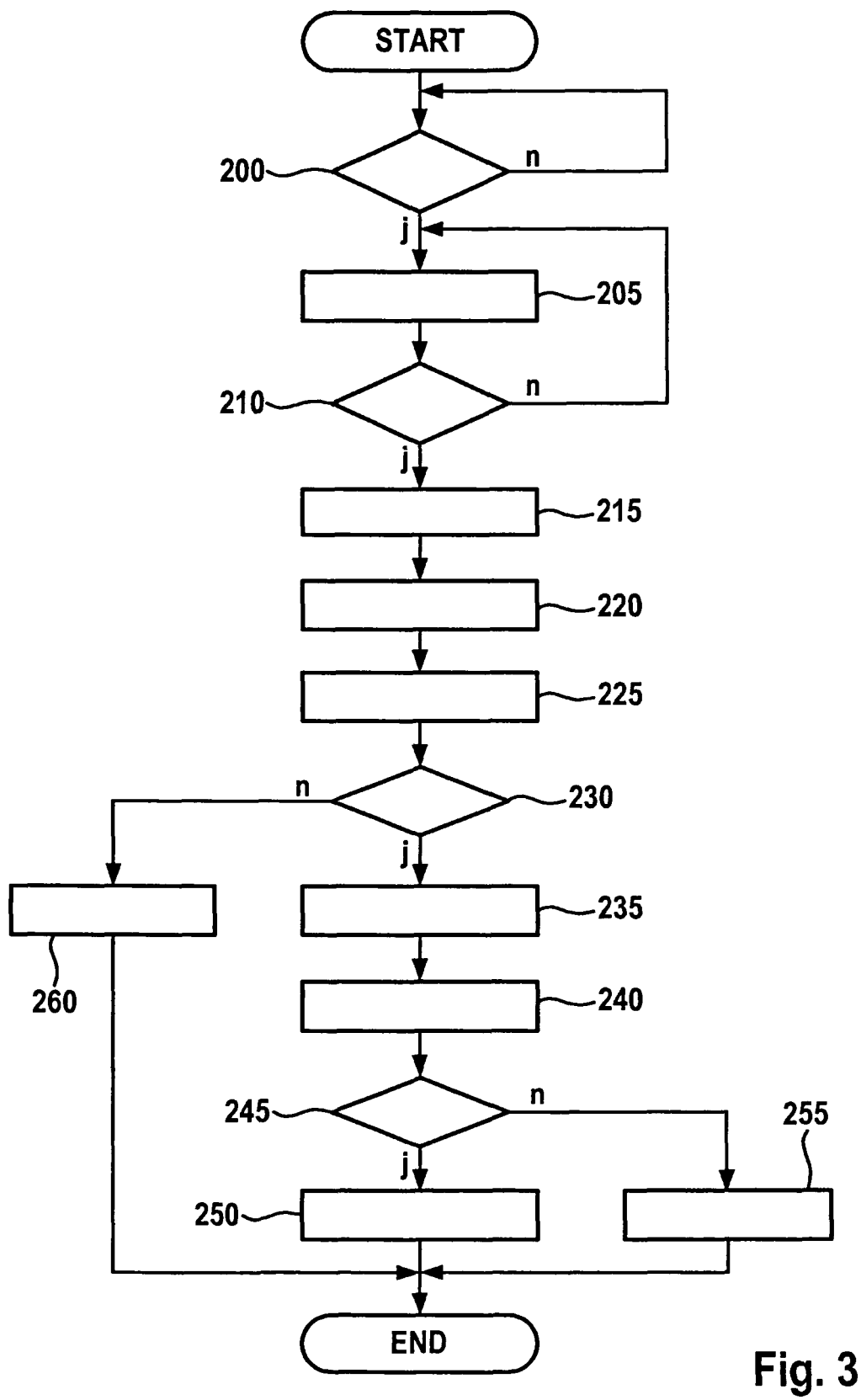
FIG. 3 shows a flow chart for an exemplary sequence of the method according to the present invention.

FIG. 3 shows a flow chart of an exemplary sequence of the method according to the present invention. After the start of the program, clutch control unit 145 checks whether a setting signal E is currently being emitted, by which clutch 10 and compressor control flap 15 are being kept open, that is, whether, for example, the idling operating state or a near-idling operating state is present. If this is the case, branching to a program point 205 occurs; otherwise, a return to program point 200 takes place.

At program point 205, first memory 130 is overwritten with the respectively current scanning value of measured air mass flow $\dot{m}$. Then, branching to a program point 210 takes place.

At program point 210, clutch control unit 145 checks with the aid of the signals of accelerator module 150 and possibly of external load requirement module(s) 155, whether a requirement for raising the load and, with that, for closing clutch 10 is present. If this is the case, branching to a program point 215 occurs; otherwise, a return to program point 205 takes place.

At program point 215, clutch control unit 145, using setting signal E, induces the closing of clutch 10 and of compressor control flap 15, as well as bringing switch 125 from the second switching position to the first switching position. Subsequently, the first specified time is awaited, based on time delay member 140 and release member 190. Then, branching to a program point 220 takes place.

At program point 220, second memory 135 is overwritten with the respectively current measuring value of air mass flow $\dot{m}$. In addition, in calculation unit 30 a current value $\dot{m}_{calc}$ is calculated for the air mass flow. Then, branching to a program point 225 takes place.

At program point 225, first comparator unit 35 forms the first difference Δ1 in the manner described above. Then, branching to a program point 230 takes place.

At program point 230, first detection unit 40 checks whether first difference Δ1 is less than the first specified threshold value. If this is the case, the method branches to a program point 235; otherwise, the method branches to program point 260.

At program point 235, first error signal F1 is set. Then, branching to a program point 240 takes place.

At program point 240, second comparator unit 45 forms the second difference Δ2 in the manner described above. Then, branching to a program point 245 takes place.

At program point 245, Second detection unit 50 checks whether second difference Δ2 is less than the second specified threshold value. If this is the case, the method branches to a program point 250; otherwise, the method branches to program point 255.

At program point 250, resulting error signal F is set, as long as the output signal of release member 190 is still set. If the output signal of release member 190 is no longer set, the resulting error signal F is, or rather remains reset. The program is then left.

At program point 255, resulting error signal F is or remains reset. The program is then left.

At program point 260, resulting error signal F is or remains reset. The program is then left.

In the present exemplary embodiment, the evaluation of air mass flow $\dot{m}$, for the diagnosis of clutch 10 of compressor 5, was described. Alternatively, instead of air mass flow $\dot{m}$, another variable characterizing air mass flow $\dot{m}$ may be used, for instance, an intake manifold pressure that prevails downstream from throttle valve 85, and is able to be recalculated via an applicable factor to air mass flow $\dot{m}$. Alternatively, the degree of opening of throttle valve 85 may also be used as a variable characteristic for air mass flow $\dot{m}$, the degree of opening of throttle valve 85 being in addition able to be recalculated to air mass flow $\dot{m}$ as a function of engine speed n.

A simplification of the specific embodiment described comes about if the first specified threshold value and/or the second specified threshold value are selected to be equal to zero. In this case, the application of the first specified threshold value and the second specified threshold value may be omitted.

The calculation of air mass flow $\dot{m}_{calc}$ in calculation unit 30 takes place as a function of the pressure drop over compressor 5 defined by first pressure $p_1$ and second pressure $p_2$, for instance, in the form of the pressure difference $p_2-p_1$ or the pressure quotient $p_2/p_1$, the temperature T of the air supplied to compressor 5 and engine speed n of the internal combustion engine.

An error is also able to be detected if clutch 10 is able to be closed only partially and not completely, and thus cannot be closed correctly. Then, to be sure, compressor 5 is put in motion by crankshaft 185, but not in a sufficient manner in the case of a slipping clutch 10. By a suitable application of the first specified threshold value and the second specified threshold value, this error case, too, may be brought to detection by setting resulting error signal F. The first specified threshold value should be applied correspondingly larger, in this case, than in the case in which it is only to be diagnosed whether clutch 10 is able to be closed completely. The first specified threshold value is in each case applied as a positive value, in this instance. The second specified threshold value is negative, as was described, and in case a slipping clutch 10 is also diagnosed as an error, it must be selected to be greater than in the case in which an error is diagnosed only if clutch 10 is not able to be closed completely.

A simplification of the diagnosis at a decreased reliability of the diagnosis may take place in that the formation of second error signal F2 is omitted. In this case, one may also do without ascertainment unit 105, 110, 115, 120, calculation unit 30, second comparator unit 45, second threshold value memory 165 and second detection unit 50.

What is claimed is:

1. A method for operating an internal combustion engine having a compressor for compressing the air supplied to the internal combustion engine, comprising:
 ascertaining a first value of a variable characterizing an air mass flow to the internal combustion engine, before turning on the compressor by closing a clutch, wherein the first value is ascertained by measuring the air mass flow using a sensor;
 turning on the compressor by closing the clutch;
 ascertaining a second value of the variable characterizing the air mass flow to the internal combustion engine, after turning on the compressor by closing the clutch; and
 detecting a first error as a function of a deviation between the first and second values of the variable characterizing the air mass flow.

2. The method as recited in claim 1, wherein the second value of the variable characterizing the air mass flow is ascertained alley the expiration of a specified time period following the closing of the clutch.

3. The method as recited in claim 1, wherein the first error is detected if the second value of the variable characterizing the air flow exceeds the first value of the variable characterizing the air mass flow by less than a first specified threshold value.

4. The method as recited in claim 1, wherein the first error is detected if the second value of the variable characterizing the air mass flow is less than the first value of the variable characterizing the air mass flow.

5. The method as recited in claim 1, wherein a bypass valve is connected in parallel to the compressor, and wherein the bypass valve is closed when the compressor is turned on by closing the clinch.

6. The method as recited in claim 5, wherein, when the first error is detected, the bypass valve is opened.

7. The method as recited in claim 1, further comprising:
 calculating a third value of the variable characterizing the air mass flow as a function of selected operating variables of the internal combustion engine including a pressure drop over the compressor, a temperature of the air supplied to the compressor, and an engine speed of the internal combustion engine;
 performing the ascertaining of the second value of the variable characterizing the air mass flow by measuring the second value using the sensor;
 detecting a second error when the second value is less than the third value; and
 outputting an error signal as a function of the detecting of the first error and the detecting of the second error.

8. The method as recited in claim 7, wherein the second error is detected when the second value is less than the third value by at least a first specified threshold value.

9. The method as recited in claim 1, wherein the second value of the variable characterizing the air mass flow is ascertained by measuring the air mass flow using the sensor.

10. A control device for operating an internal combustion engine having a compressor configured to be turned on by closing of a clutch, the compressor for compressing the air supplied to the internal combustion engine, the device comprising:
 an ascertainment unit configured to:
  ascertain a first value of a variable characterizing an air mass flow to the internal combustion engine, before turning on the compressor by closing a clutch, wherein the first value is ascertained by measuring the air mass flow using a sensor; and
  ascertain a second value of the variable characterizing the air mass flow to the internal combustion engine, after turning on the compressor by closing the clutch;
 a comparison unit configured to compare the first and second values of the variable characterizing the air mass flow; and
 a detection unit configured to detect a first error as a function of the deviation between the first and second values of the variable characterizing the air mass flow.

11. The method as recited in claim 8, wherein the first error is detected if the second value exceeds the first value by less than a second specified threshold value, which is different than the first specified threshold value.

12. The method as recited in claim 8, wherein the first specified threshold value takes into account tolerances in the calculating of the third value and the measuring of the second value.

13. The method as recited in claim 7, wherein the outputting of the error signal is conditional upon both the first error and the second error being detected.

14. The method as recited a claim 7, wherein the sensor is located upstream from a sensor that measures the pressure drop over the compressor; and upstream from a sensor that measures the temperature of the air supplied to the compressor.

15. The control device as recited in claim 10, further comprising:
 a calculation unit configured to calculate a third value of the variable characterizing the air mass flow as a function of selected operating variables of the internal combustion engine including a pressure drop over the compressor, temperature of the air supplied to the compressor, and an engine speed of the internal combustion engine;
 a second comparison unit configured to compare the second and the third values, wherein the second value Is ascertained by measure at the sensor;
 a second detection unit configured to detect a second error when the second value is less than the third value; and an output arrangement configured to output an error signal as a function of the detecting of the first error and the detecting of the second error.

16. The method as recited in claim 15, wherein the second error is detected when the second value is less than the third value by at least a first specified threshold value.

17. The control device as recited in claim 16, wherein the first error is detected if the second value exceeds the first value by less than a second specified threshold value, which is different than the first specified threshold value.

18. The control device as recited in claim 16, wherein the first specified threshold value takes into account tolerances in the calculating of the third value and the measuring of the second value.

19. The control device as recited in claim 15, wherein the outputting of the error signal is conditional upon both the first error and the second error being detected.

20. The control device AS recited in claim 15, wherein the sensor is located upstream from a sensor that measures the pressure drop over the compressor, and upstream from a sensor that measures the temperature of the air supplied to the compressor.

21. The control device as recited in claim 10, wherein the second value of the characterizing the air mass flow is ascertained by measuring the air mass flow using the sensor.

* * * * *